United States Patent
Gatenholm et al.

(10) Patent No.: US 12,092,530 B2
(45) Date of Patent: Sep. 17, 2024

(54) MATERIAL CARTRIDGE ARRANGEMENT FOR A DISPENSING SYSTEM

(71) Applicant: Cellink Bioprinting AB, Gothenburg (SE)

(72) Inventors: Erik Gatenholm, Gothenburg (SE);
Hector Martinez, Gothenburg (SE);
Ginger Lohman, Gothenburg (SE);
Mateusz Piotrzkowski, Mölndal (SE);
Bryan Jones, Buchanan, VA (US); Eric Bronnenkant, Pembroke, VA (US);
Kyung Hun Jung, Blacksburg, VA (US)

(73) Assignee: Cellink Bioprinting AB, Gothenburg (SE)

( * ) Notice: Subject to any disclaimer, the term of this patent is extended or adjusted under 35 U.S.C. 154(b) by 539 days.

(21) Appl. No.: 17/462,615

(22) Filed: Aug. 31, 2021

(65) Prior Publication Data

US 2022/0063195 A1    Mar. 3, 2022

(30) Foreign Application Priority Data

Sep. 2, 2020  (SE) .................................... 2051037-6

(51) Int. Cl.
*G01K 13/02*     (2021.01)
*B29C 64/255*    (2017.01)
(Continued)

(52) U.S. Cl.
CPC .......... *G01K 13/026* (2021.01); *B29C 64/255* (2017.08); *B29C 64/393* (2017.08); *B33Y 40/00* (2014.12); *B33Y 50/02* (2014.12)

(58) Field of Classification Search
CPC ..... B05B 9/002; B05B 9/0838; B29C 64/106; B29C 64/255; B29C 64/393; B33Y 30/00;
(Continued)

(56) References Cited

U.S. PATENT DOCUMENTS 6,945,638 B2     9/2005  Teung et al.
11,479,046 B2 *  10/2022 Gardner ................. B33Y 50/00
(Continued)

FOREIGN PATENT DOCUMENTS

CN   108501373 A    9/2018
CN   109863379   *  6/2019   ............. G01K 13/02
(Continued)

OTHER PUBLICATIONS

Swedish Search Report prepared for priority application SE 2051037-6 mailed Apr. 12, 2021.

*Primary Examiner* — Anh T Vo
(74) *Attorney, Agent, or Firm* — McCarter & English, LLP

(57) ABSTRACT

A material cartridge arrangement (100, 101) for a dispensing system, comprising a material cartridge (2) having a first end (2a), an opposing second end (2b) and an ink material channel (5) extending between the first and second ends in the material cartridge (2), the ink material channel (5) being bounded by an ink material channel wall/walls (9) extending between the first (2a) and second ends (2b). An ink material pressurising device (3) is arranged to cause ink material hold in the ink material channel (5) to flow in a direction from said first end (2a) towards said second end (2b) and through an ink material outlet. At least one temperature sensing element (16) is arranged at a position along the direction of extension of the ink material channel (5) and arranged to measure a temperature at the ink material channel wall (9).

13 Claims, 7 Drawing Sheets

(51) Int. Cl.
*B29C 64/393* (2017.01)
*B33Y 40/00* (2020.01)
*B33Y 50/02* (2015.01)

(58) Field of Classification Search
CPC ........ B33Y 40/00; B33Y 50/02; G01K 1/026; G01K 13/026
See application file for complete search history.

(56) References Cited

U.S. PATENT DOCUMENTS

| | | |
|---|---|---|
| 2018/0281280 A1 | 10/2018 | Solorzano et al. |
| 2019/0009474 A1 | 1/2019 | Wang et al. |
| 2019/0217527 A1 | 7/2019 | Boyd, IV |

FOREIGN PATENT DOCUMENTS

| | | | | |
|---|---|---|---|---|
| CN | 110239096 A | 9/2019 | | |
| KR | 2020-0052396 A | 5/2020 | | |
| WO | WO 2019/205832 A1 | 10/2019 | | |
| WO | WO2020165322 | * | 8/2020 | ............. B33Y 30/00 |

* cited by examiner

MATERIAL CARTRIDGE ARRANGEMENT FOR A DISPENSING SYSTEM

TECHNICAL FIELD

The present document relates to a material cartridge arrangement for a dispensing system, a 3D printer and a biodispensing system comprising such material cartridge arrangements, and a method of measuring a temperature of an ink material contained in an ink material channel of a material cartridge of a dispensing system.

BACKGROUND ART

A fluid dispensing system is a device, machine or equipment that is responsible for dispensing a fluid in controlled quantities and apply it on a desired area. Being able to precisely dispense fluids onto a specific point in a controlled way is a main characteristic of fluid dispensing systems, and may be utilized in 3D printing, an additive manufacturing technology.

3D bioprinting is based on a process in which a biomaterial can be deposited layer-by-layer using a 3D bioprinter. Biomaterials such as hydrogels or other polymers can be combined with cells and growth factors to imitate natural tissues. The technology is used in the fields of bioengineering and medicine. It offers unlimited possibilities in the applications from drug screening to organ regeneration.

The 3D bioprinter is capable of extruding material with or without cells while moving in three directions, which enables the building of complex structures. The printed geometries may initially be designed in CAD software or created using a 3D scanner. The geometries are then imported into a computer application, which based on a set of parameters outputs a geometric code file. The geometric code file can be further imported to a 3D printer, which translates the file into the physical movement of the printhead, and the material extrusion. In some of the models of 3D bioprinters the process of converting the 3D model into the geometric code file is integrated into the 3D bioprinter software.

Examples of fluids used in dispensing systems within the life science industry include cell culture reagents such as cell culture media, growth factors, cell culture ingredients, animal-derived supplements, non-animal origin supplements and hydrogels for 3D cell culture.

The popularity of 3D bioprinting has driven the development of printable materials in recent years. A useful biomaterial must provide sufficient scaffolding to support the cells but at the same time, it must be easily printable. The printability of the biomaterial depends on several factors including but not limited to its chemical composition, cell content, and viscosity at a shear rate and temperature.

Viscosity of a biomaterial is a crucial parameter affecting its print quality. The first factor affecting the viscosity of the biomaterial is a shear rate. Shear rate increases significantly when extruding the biomaterial through a nozzle. To allow a constant, laminar flow of the material through the nozzle, the biomaterial should present a shear-thinning behaviour. The second factor affecting the viscosity of the biomaterial is its temperature. Some biomaterials have higher viscosities at higher temperatures while others have lower viscosity at higher temperatures.

Too low viscosity of a biomaterial results in a non-consistent width of the extruded filament. Furthermore, low viscosity biomaterials do not have enough structural integrity to support constructs higher than one layer. On the other hand, high viscosity biomaterials require high pressures to be extruded. If the viscosity is too high the required pressure might exceed the capabilities of the 3D bioprinter.

Some biomaterials gelate and crosslink at a certain temperature range. Heterogenous crosslinking causes significant and non-uniform increase of viscosity which results in poor control of print quality. Higher viscosity components of the biomaterials require higher pressure inside the syringe to be extruded. As a result, when the gelated part reaches the nozzle tip it clogs the nozzle end until the pressure inside the syringe reaches the level required to push the gelated part through. In some cases, achieved pressure might not be enough to push the gelated part through the nozzle tip causing permanent clogging. For those biomaterials that present such behaviour, it is crucial to keep the temperature of the material below the gelation temperature. In many situations, the temperature must be kept close to the point of gelation so that when the material is dispensed, it gelates onto the printed substrate as quickly as possible. This situation also requires precise control of the biomaterial temperature during dispensing. Many common hydrogels used for 2D and 3D cell culture, e.g. Matrigel®, require a cool temperature below 4° C. to be able to be processed over short (within minutes) and long (hours) periods of time without inducing polymerization in the dispensing nozzle.

When 3D bioprinting the biomaterial with cell content, cellular viability must be considered. Providing the right conditions for cells to live requires keeping temperature close to 37° C. Either too high a temperature or too low a temperature will cause the cellular viability to decrease.

Heated dispensing heads are often used in 3D-printing, as well as in precision dispensing systems, because the heating function can allow the printability/dispensing of materials by increasing the temperature of the material above or close to its melting or gelation point to make it flow through a needle, nozzle or orifice to form a droplet and/or filament without clogging the nozzle.

Hence, keeping the biomaterial at the right temperature is crucial to achieving a successful print. For many biomaterials, the optimal temperature window is very narrow and requires precise temperature control just below the gelation temperature.

US20190009474A1 discloses a bioprinter comprising a flow channel temperature control system for controlling an outlet of a bioprinting material container. The temperature control system comprises a semiconductor refrigeration device that, in combination with an actively cooled heat exchanger, cools down the block that holds the syringe. The disclosed solution comprises two temperature sensors, one embedded in the cooling block that holds the syringe and another temperature sensor embedded in the heat exchanger. Such a solution provides only one temperature measurement near the syringe body. Therefore, the temperature of the biomaterial in the nozzle is unknown. Such lack of temperature measurement may result in uncontrolled gelation and even clogging of the nozzle.

U.S. Pat. No. 6,945,638B2 discloses a method and system for controlling the temperature of a dispensed liquid at the point of dispensing. The system comprises a dispenser, a first heatsink thermally connected to the dispenser and a temperature-altering device that controls a temperature of the dispensing structure at the point of dispensing of the liquid. The temperature-altering device comprises a Peltier module and a sensor that measures the temperature at the point of dispensing the liquid. The temperature sensor may be a thermocouple, thermistor, resistance temperature detector, a non-contact temperature-measuring device such as an infrared temperature sensor or other temperature sensor known in the art. The disclosed solution has the advantage of providing precise temperature control at the point of dispensing. However, placing the temperature-altering device at the point of dispensing is difficult due to space limitations. Dispensing liquids and hydrogels in well plates requires the nozzle or syringe tip to reach the bottom of the well. With the temperature-altering device attached at the point of dispensing such assembly would not fit inside the dish.

US20180281280A1 discloses a multi-headed auto-calibrating bioprinter with heated and cooled heads. At least one of the plurality of cartridges comprises one or more temperature control units. The control units comprise a heating unit, a cooling unit, a thermoelectric unit, a fan, or a combination thereof. The solution has the advantage of controlling temperature independently in different points of the syringe. The disadvantage of the system is its complexity.

In view of these solutions there is, thus, a need to provide an improved device and method for measuring and preferably also controlling the temperature of biomaterial during a dispensing or 3D bioprinting process.

SUMMARY OF THE INVENTION

It is an object of the present disclosure to provide an improved or at least an alternative material cartridge arrangement for a dispensing system for measuring the temperature of an ink material contained in a cartridge of the cartridge arrangement. It is also an object to provide a method for such temperature measurement.

The invention is defined by the appended independent patent claims. Non-limiting embodiments emerge from the dependent patent claims, the appended drawings and the following description.

According to a first aspect there is provided a material cartridge arrangement for a dispensing system, comprising a material cartridge having a first end, an opposing second end and an ink material channel extending between the first and second ends in the material cartridge, the ink material channel being bounded by an ink material channel wall/walls extending between the first and second ends, the ink material channel being arranged to hold an ink material, and the second end comprises an ink material outlet. An ink material pressurising device is arranged to cause ink material hold in the ink material channel to flow in a direction from the first end towards the second end and through the ink material outlet. At least one temperature sensing element is arranged at a position along the direction of extension of the ink material channel and arranged to measure a temperature at the ink material channel wall.

The dispensing system may be used as or in a biodispensing system or in a 3D printer, such as a 3D bioprinter.

The ink material may be any dispensable or printable biomaterial, which may or may not contain living cells. The ink material may for example be a temperature-sensitive material that requires a temperature above room temperature to be processed/dispensed without clogging, or be a temperature-sensitive material that requires a low temperature such as of 4° C. or lower to be processed/dispensed without clogging.

The ink material pressurising device may comprise a plunger, such as a syringe piston arranged to be linearly pulled and pushed along the inside of a syringe body, to pressurise and extrude ink material through the ink material outlet to be dispensed/printed. The plunger may be actuated by pneumatic, hydraulic, electro-magnetic, or by other kinetic drive systems. Alternatively, the pressurising device may comprise a pneumatic, hydraulic, electro-magnetic (solenoid driven) or other kinetic system.

A tip portion such as a nozzle or needle may be connectable to the ink material outlet, through which nozzle/needle ink material may be dispensed/printed.

The at least one temperature sensing element may be arranged at any position along the ink material channel. Often, however, a temperature sensing element arranged closer to the ink material outlet would give more valuable information than a temperature sensing element arranged closer to the first end of the material cartridge in terms of for example risk of clogging of the ink material at the ink material outlet.

With the present material cartridge arrangement, a temperature at the ink material channel wall is measured with the at least one temperature sensing element. As the ink material in the ink material channel is in direct contact with the ink material channel wall(s) and the at least one sensor is arranged to measure a temperature at the wall of the ink material channel, this is a temperature measurement close to measuring at the ink material as such. The temperature difference between the ink material in the channel and the one measured at the wall is, hence, small. By this cartridge arrangement it is therefore possible to follow the temperature of the ink material as such that at least one position in the ink material channel. The ink material may have different temperatures at different positions in the channel. If the temperature of the ink material at the ink material outlet deviates from the optimum temperature interval for that ink material, i.e. a too high or a too low temperature, clogging of ink material at the outlet may occur. By means of the temperature sensing elements such problems may be identified. Identifying deviating temperatures of the ink material at other positions in the ink material channel may also indicate that problems with dispensing/printing may occur.

The temperatures may be measured before, during and/or after a dispensing/printing action with the dispensing system, during which material ink is forced out of the material channel through the ink material outlet by means of the pressurising device.

Temperatures may be measured constantly. Temperatures may be measured at time intervals. Temperatures may be measured more frequently during dispensing than before/after dispensing.

The material cartridge arrangement may comprise at least two, at least three, at least four, at least five or at least six temperature sensing elements arranged at a distance from each other along the direction of extension of the ink material channel.

The temperature sensing elements may be arranged at respective positions at a distance from each other along the direction of extension of the ink material channel, and be arranged to measure temperatures at respective positions at the ink material channel wall/walls.

It may be advantageous to measure the temperature of the ink material at multiple positions in the ink material channel. Thereby obtaining a more precise picture of variations in temperature along the ink material channel.

Further, using several temperature sensing elements along the ink material channel, a temperature rate of change can be estimated.

The temperature sensing elements may for example be located in a pattern with even distance between the elements or with decreasing distance closer to the ink material outlet.

Preferably, one temperature sensing element is arranged at a position close to or at the ink material outlet.

The material cartridge arrangement may further comprise a tip portion connectable to the ink material outlet of the material cartridge and at least one temperature sensing element arranged to measure a temperature at the tip portion.

The tip portion may be a nozzle or needle.

The temperature sensing element may be selected from a group of thermocouples, thermistors, resistance thermometers, semiconductor sensors, digital temperature sensors, thermopiles, thermal cameras, infrared array sensors, laser-based temperature sensors and pyrometers. The material cartridge may further comprise a temperature analysing unit arranged to receive and analyse temperature data from the temperature sensing elements.

The analysis may comprise to register the measured temperatures. The analysis may further comprise to compare the temperature data of a temperature sensing element with previous measured temperature data from that temperature sensing element, and/or to compare the temperature data with a predetermined temperature value or values, and/or to, if more than one temperature sensing element is used, to compare the temperature data from the different temperature sensing elements with each other.

The temperature analysing unit may display the registered measured temperatures and/or the compared temperature data on a display or send this information to a separate display unit.

Based on the analysis, the temperature analysing unit may determine if any heating/cooling of the ink material in the ink material channel is needed for example for avoiding clogging of in material at the ink material outlet.

The material cartridge arrangement may further comprise a temperature regulating system arranged to, based on instructions received from the temperature analysing unit, adjust the temperature of the ink material in the ink material channel.

The temperature regulating system may be arranged to adjust the temperature of the ink material channel and ink material contained therein at specific points along the ink material channel, at the ink material outlet (at the point of extrusion) or along the whole extension of the ink material channel.

Controlling the temperature of the ink material in the ink material channel, the temperature of ink material leaving the ink material channel through the ink material outlet, possible through a tip portion connected to the ink material outlet, may be controlled.

The material cartridge arrangement may further comprise an ink material level measuring device arranged to measure a level of ink material in the ink material channel.

The measured level of ink material in the ink material channel may be sent to the temperature analysing unit.

From the ink material level information and information about positions of the temperature sensing elements along the ink material channel the temperature analysing unit may determine which of the temperature sensing elements are measuring temperatures of the ink material and which are measuring at positions where there is no ink material in the ink material channel. Only temperature sensing elements measuring at positions where there is ink material in the ink material channel may then be included in the analysis of measured temperatures and in any temperature adjustment based thereon.

The at least one temperature sensing element may be arranged in the ink material channel wall.

The ink material channel wall may be the material cartridge wall or a wall arranged inside of the material cartridge wall. The temperature sensing element arranged in the wall may be integrated in the wall.

The at least one temperature sensing element may be arranged between an outer sleeve and an inner sleeve of the ink material channel wall.

Alternatively, the at least one temperature sensing element may be arranged at an outside of the ink material channel wall, the outside of the wall facing away from material ink hold in the material ink channel.

In yet an alternative, the at least one temperature sensing element may be arranged at an inside of the ink material channel wall, the inside of the wall facing towards the material ink hold in the material ink channel.

A material of the ink material channel wall may have a thermal conductivity of at least 100 W/mK or above.

In some embodiments, the material of the ink material channel wall may have a thermal conductivity of at least 200 W/mK.

Examples of materials which may be used for the ink material channel wall may be selected from aluminium, aluminium nitride, copper, silver, gold, silicon, silicon carbide, diamond, tungsten, magnesium, bronze, beryllium, chromium, molybdenum, brass, zinc, graphite or any combination or alloy thereof.

In an alternative embodiment, the materials used for the ink material channel wall may have a thermal conductivity of at least 10 W/mK and be selected from iron, carbon, manganese, nickel, chromium, molybdenum, vanadium, silicon, nitrogen, aluminium, sulphur, titanium, copper, selenium, niobium, tungsten, tin, zinc and zirconium or any combination or alloy thereof.

In yet an alternative embodiment, the material used for the ink material channel wall could instead be glass or polymers. Such polymers could be amorphous or crystalline polymers such as polypropylene, polyethylene, cyclo-olefin copolymer, cyclo-olefin polymer, polyethylene terephthalate, polycarbonate, and polyamide. All mentioned polymers having a thermal conductivity higher than 0.1 W/mK.

According to a second aspect there is provided a 3D printer comprising the material cartridge arrangement described above.

According to a third aspect there is provided a biodispensing system comprising the material cartridge arrangement described above.

According to a fourth aspect there is provided a method of measuring a temperature of an ink material contained in an ink material channel of a material cartridge of a dispensing system. The method comprises steps of arranging at least one temperature sensing element along a direction of extension of the ink material channel at a wall of the ink material channel. By means of the at least one temperature sensing element measure a temperature at the ink material channel wall, and analysing temperature sensor data from the at least one temperature sensing element.

The method may further comprise to, based on the analysed temperature sensor data, adjust the temperature of the ink material in the ink material channel.

The method may further comprise to determine a level of ink material in the ink material channel and comparing the level of ink material to a position of the at least one temperature sensing element along the ink material channel and using this comparison to determine which temperature sensor data to include in the analysis.

DETAILED DESCRIPTION

Figure 1:
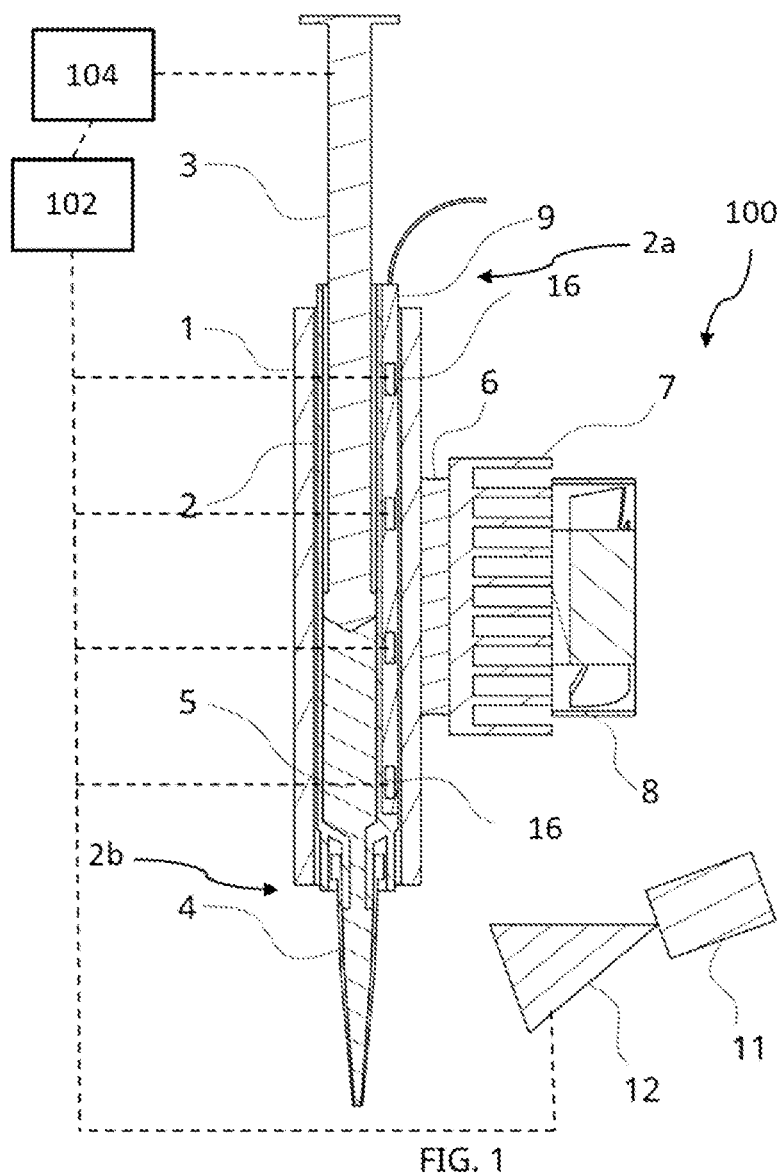
FIG. 1 shows a material cartridge arrangement for a dispensing system with a plurality of temperature sensing elements arranged in a wall of an ink material channel, where the temperature sensing elements are arranged to measure temperatures at respective positions at the ink material channel wall.
Figure 3:
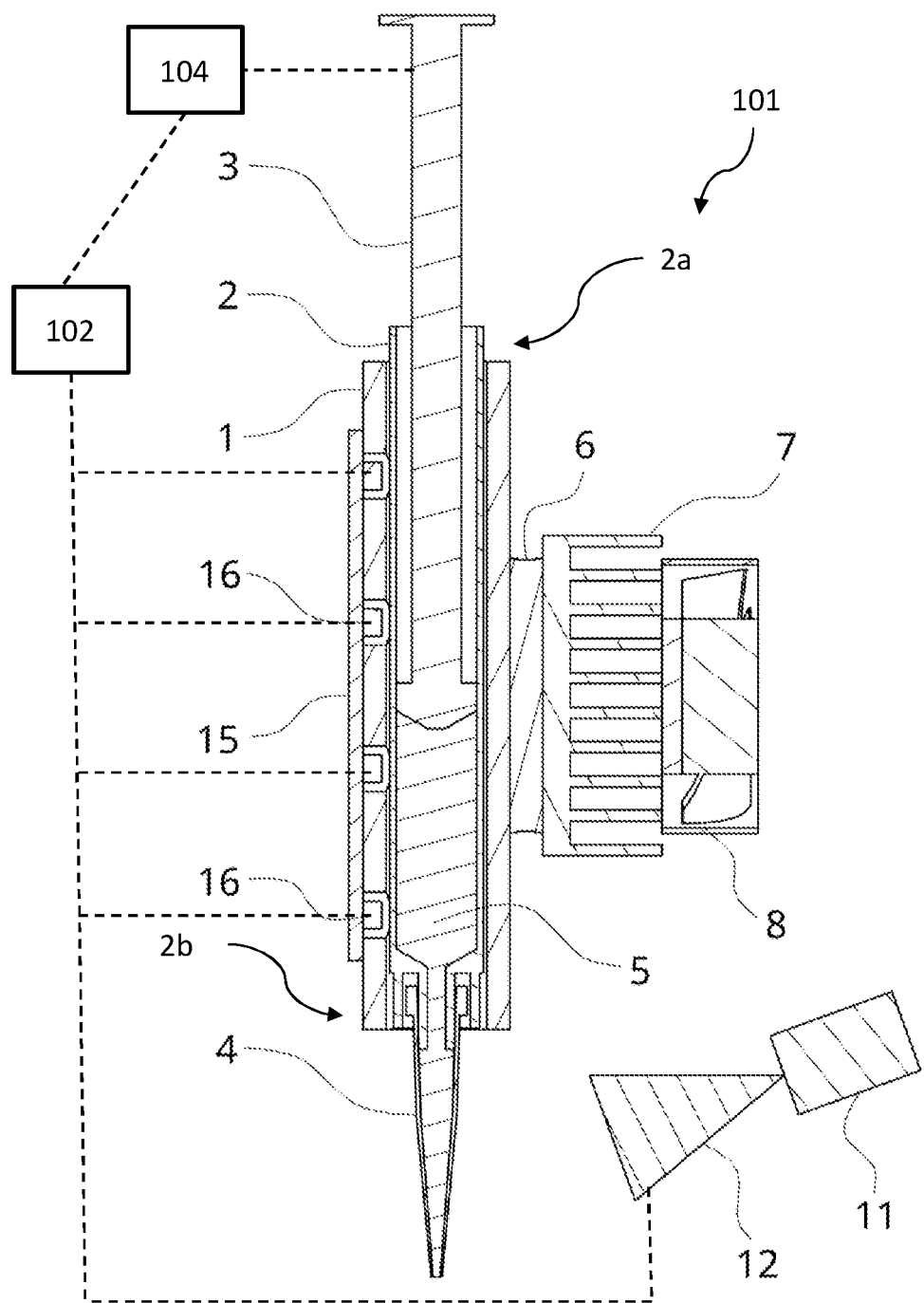
FIG. 3 shows a material cartridge arrangement for a dispensing system with a plurality of temperature sensing elements arranged at an outside of a wall of an ink material channel, where the temperature sensing elements are arranged to measure temperatures at respective positions at the ink material channel wall.

In FIGS. 1 and 3 are shown a material cartridge arrangement 100, 101 for a dispensing system. The material cartridge arrangement comprises a material cartridge 2 having a first end 2a, an opposing second end 2b, and an ink material channel 5, which extends between the first and second ends in the material cartridge 2. The ink material channel is bounded by an ink material channel wall/walls (9) extending between the first 2a and second ends 2b.

The material cartridge 2 may be a cylindrical tube, a barrel etc. The material cartridge 2 may be, as illustrated in the figures, the body of a syringe or a modified syringe. The ink material channel 5 may be tubular, square or rectangular and bounded by a wall/walls 9. The ink material channel wall/walls 9 extending between the first 2a and second end 2b of the material cartridge 2. The ink material channel wall/walls 9 may be comprise a wall/walls of the material cartridge 2. Alternatively, the ink material channel wall/walls 9 may comprise a wall/walls arranged inside of the material cartridge wall/walls. The ink material channel 5 is arranged to hold an ink material and the second end 2b comprises an ink material outlet. The material cartridge 2 may be inserted in or be a part of a cooling block/heating block. The ink channel walls 9 may be made of a material which effectively transfer heat, i.e. has a thermal conductivity of at least 100 W/mK or above, such as aluminium, aluminium nitride, copper, silver, gold, silicon, silicon carbide, diamond, tungsten, magnesium, bronze, beryllium, chromium, molybdenum, brass, zinc, graphite or any combination or alloy thereof.

An ink material pressurising device 3 is arranged to cause ink material hold in the ink material channel 5 to flow in a direction from the first end 2a towards the second end 2b and through the ink material outlet.

The ink material may be any dispensable or printable biomaterial, which may or may not contain living cells. The ink material may for example be a temperature-sensitive material, which requires a temperature above room temperature to be processed/dispensed. By increasing the temperature of the material above or close to its melting or gelation point the material can be dispensed without clogging. Such materials may be gelatine-based materials such as e.g. GelMA from Cellink®.

The ink material may be a material requiring a cool temperature, such as for example below 4° C., to be able to be processed without inducing polymerization and clogging during dispensing. ECM hydrogels, which are extracellular matrix-derived solutions such as gelatinous protein mixtures, extracellular matrix proteins in solution (in acidic, neutral or basic pH), and basement membrane matrices such as Matrigel®, Geltrex® and Cultrex® Basement Membrane Extract, are all temperature-sensitive materials that require a low temperature for dispensing.

The ink material pressurising device 3 may comprise a plunger, as illustrated in FIGS. 1-4, such as a syringe piston arranged to be linearly pulled and pushed along the inside of a syringe body, to pressurise and extrude ink material through the ink material outlet to be dispensed/printed. The plunger may be actuated by pneumatic, hydraulic, electromagnetic, or by other kinetic drive systems. Alternatively, the pressurising device 3 may comprise a pneumatic, hydraulic, electro-magnetic (solenoid driven) or other kinetic system.

A tip portion 4 such as a nozzle or needle may be connectable to the ink material outlet at the second end 2b of the material cartridge 2, through which nozzle/needle ink material may be dispensed/printed. When attached to the ink material outlet, the tip portion 4 may be the only exit point for ink material.

One or more temperature sensing elements 16, such as at least one, at least two, ate least three, at least four, at least five or at least six temperature sensing elements 16 (four temperature sensing elements 16 are exemplified in FIGS. 1 and 3) are arranged along the direction of extension of the ink material channel 5 and are arranged to measure a temperature at the ink material channel wall 9.

The at least one temperature sensing element 16 may be arranged at any position along the ink material channel 5. Often, however, a temperature sensing element 16 arranged closer to the ink material outlet would give more valuable information than a temperature sensing element 16 arranged closer to the first end 2a of the material cartridge 2 in terms of for example risk of clogging of the ink material at the ink material outlet at the second end 2b.

With the present material cartridge arrangement 100, 101, a temperature at the ink material channel wall 9 is measured with the at least one temperature sensing element 16. As the ink material in the ink material channel 5 is in direct contact with the ink material channel wall(s) 9 and the at least one temperature sensing element 16 is arranged to measure a temperature at the wall 9 of the ink material channel 5, this is a temperature measurement close to measuring the temperature of the ink material as such. The temperature difference between the ink material in the ink material channel 5 and the one measured at the wall 9 is, hence, small. By this cartridge arrangement 100, 101 it is therefore possible to follow the temperature of the ink material as such as at least one position in the ink material channel 5. The ink material may have different temperatures at different positions in the ink material channel 5. If the temperature of the ink material at the ink material outlet deviates from the optimum temperature interval for that ink material, i.e. a too high or a too low temperature, clogging of ink material at the outlet may occur. By means of the temperature sensing elements 16 such problems may be identified. Identifying deviating temperatures of the ink material at other positions in the ink material channel 5 may also indicate that problems with dispensing/printing may occur. The material of the ink material channel wall(s) 9 could be a material that effectively transports heat. Thereby, any measurement taken at the ink material channel wall 9 is as close as possible to the actual temperature of the ink material. If made of a less appropriate material, deviations from the actual temperature would occur since the heat would flow slowly and changes in the temperature would not be detected as quickly The temperatures may be measured before, during and/or after a dispensing/printing action, during which material ink is forced out of the material channel 5 through the ink material outlet by means of the pressurising device 3.

Temperatures may be measured constantly. Temperatures may be measured at different time intervals. Temperatures may be measured more frequently during dispensing than before/after dispensing.

The temperature sensing elements 16 may be arranged at respective positions at a distance from each other along the direction of extension of the ink material channel 5, and be arranged to measure temperatures at respective positions at the ink material channel wall/walls 9.

Preferably, a temperature sensing element 16 is arranged at a position close to or at the ink material outlet at the second end 2b.

It may be advantageous to measure the temperature of the ink material at multiple positions in the ink material channel 5. Thereby obtaining a more precise picture of variations in temperature along the ink material channel 5. Also, using several temperature sensing elements 16 along the ink material channel 5, a temperature rate of change can be estimated. When using a plurality of temperature sensing elements 16, the elements may for example be located in a pattern with even distance between the elements (as illustrated in FIGS. 1 and 3) or with decreasing distance closer to the ink material outlet at the second end 2b (not illustrated).

Measuring a temperature of the ink material at the tip portion 4 may be important, as at the tip portion 4 low volumes of the ink material are heated/cooled quickly by air surrounding the tip portion. Therefore, at least one temperature sensing element 11 may be arranged to measure such a temperature. In FIGS. 1 and 3, such a temperature sensing element 11 is illustrated together with its viewing angle 12.

The temperature sensing element 16, 11 may be selected from a group of thermocouples, thermistors, resistance thermometers, semiconductor sensors, digital temperature sensors, thermopiles, thermal cameras, infrared array sensors, laser-based temperature sensors and pyrometers.

When using more than one temperature sensing element 16, 11, such as at least two sensing elements 16 arranged along the ink material channel 5 or one or more sensing elements 16 arranged along the ink material channel 5 and one sensing element 11 arranged to measure at the tip portion 4, the sensing elements 16, 11 used can be the same kind of sensing elements or one or more of the sensing elements may be a different type of sensing element.

The temperature sensing elements 16, 11 may be arranged in direct contact with the ink material channel wall 9 or tip portion 4, using contact temperature sensing elements such as thermocouples, thermistors, resistance thermometers, semiconductor sensors or digital temperature sensors.

Alternatively, the temperature sensing elements 16, 11 may be arranged at a distance from the ink material channel wall 9 and the tip portion 4, using non-contact temperature sensing elements such as thermopiles, thermal cameras, infrared array sensors, laser-based temperature sensors, or pyrometers.

Sensing elements 16, 11 arranged closer to or at the wall 9/tip 4 may give a more accurate temperature measurement than temperature sensing elements 16, 11 arranged at a distance from the wall 9/tip 4. There may be difficulty in incorporating a direct-contact sensor at the tip portion 4 when needing to fit the tip into a well plate well during dispensing/printing. In such cases one could use a non-contact IR sensor of some sort. There are other systems that could utilize contact-based systems at the tip portion if not needed to fit into a well plate.

Figure 2:
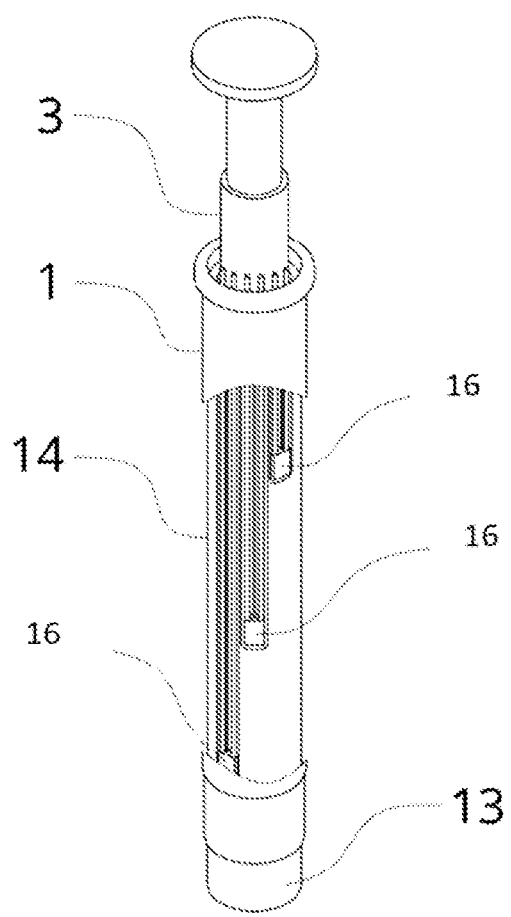
FIG. 2 shows a more detailed view of the material cartridge in FIG. 1 and the arrangement of the temperatures sensing elements in the wall of the ink material channel.

In FIGS. 1 and 2 is shown one embodiment of the material cartridge arrangement 100, wherein temperature sensing elements 16 arranged in the material channel wall 9. The wall 9 may be the material cartridge wall or a wall arranged inside of the material cartridge wall. The temperature sensing element(s) 16 in the wall 9 may be integrated in the wall. As illustrated in FIG. 2, the temperature sensing elements 16 may be arranged between an outer sleeve 1 and an inner sleeve 14 of the ink material channel wall 9.

Alternatively, as illustrated in FIG. 2, the at least one temperature sensing element 16 may be arranged at an outside of the ink material channel wall 9, the outside of the wall facing away from material ink hold in the ink material channel 5. The temperature sensing element may be arranged at a distance from, in non-direct contact with the wall 9, or in direct contact with the outside of the wall 9. When arranged at an outside of the ink material channel wall 9, such a temperature sensing element 16 may be for example embedded in or arranged at a cooling block surrounding the material cartridge.

In yet an alternative (not illustrated), the at least one temperature sensing element 16 may be arranged at an inside of the ink material channel wall 9, the inside of the wall facing towards the material ink hold in the ink material channel 5. Such a temperature sensing element 16 may be in direct or indirect contact with the inside of the ink material channel wall 9. The temperature sensing element 16 may be in direct contact with ink material hold in the ink material channel 5.

The material cartridge 2 may further comprise a temperature analysing unit 102 arranged to receive and analyse temperature data from the temperature sensing elements 16, 11. The temperature sensing elements 16, 11 are arranged to send measured temperature data to the temperature analysing unit 102. The temperature analysing unit 102 is arranged to analyse the temperature data from the different temperature sensing elements 16. The analysis may comprise to compare the temperature data of a temperature sensing element 16, 11 with previous measured temperature data from that temperature sensing element, and/or to compare the temperature data from the different temperature sensing elements with each other, and/or to compare the temperature data with a predetermined temperature value or values.

Based on the analysis, the temperature analysing unit 102 may determine if any heating/cooling of the ink material in the ink material channel 5 is needed for example for avoiding clogging of ink material at the ink material outlet. If yes, instructions may be sent to a temperature regulating system 1, 6, 7, 8 to adjust the temperature of the ink material in the ink material channel.

The adjustment may be a heating/cooling of the ink material dependent on ink material used and temperatures measured. The temperature regulating system 1, 6, 7, 8 may be arranged along the whole extension of the ink material channel 5 or be arranged at one or more sections of the ink material channel 5 or at the ink material outlet.

The temperature-regulating system 1, 6, 7, 8 may be arranged to adjust the temperature of the ink material to a temperature within a range of −10° C. to 20° C., such as within a range of −10° C. to 15° C., −10° C. to 10° C., −10° C. to 5° C., −10° ° C. to 0° C., −10° C. to −5° ° C., −5° C. to 20° C., −5° C. to 15° C., −5° ° C. to 10° ° C., −5° ° C. to 5° ° C., −5° C. to 0° ° C., 0° ° C. to 20° ° C., 0° ° C. to 15° C., 0° ° C. to 10° C., 0° ° C. to 5° C., 5° ° C. to 20° ° C., 5° ° C. to 15° C. or 5° ° C. to 10° ° C., 10° C. to 20° ° C., 10° ° C. to 15° C. or 15° C. to 20° C.

The temperature-regulating system 1, 6, 7, 8 may be alternatively or additionally be arranged to adjust the temperature of the ink material to a temperature within a range of 20 to 120° C., such as a temperature within a range of 20° C. to 100° ° C., 20° C. to 80° C., 20° C. to 60° C., 20° ° C. to 40° ° C., 40° ° C. to 120° ° C., 40° ° C. to 100° ° C., 40° ° C. to 80° ° C., 40° ° C. to 60° ° C., 60° ° C. to 120° C., 60° ° C. to 100° C., 60° ° C. to 80° ° C., 80° ° C. to 120° ° C., 80° C. to 100° ° C. or 100° ° C. to 120° C.

Adjustment of the temperature of the ink material may take place during and/or after and/or before a dispensing action through the ink material outlet.

Thereby, ink materials requiring a specific temperature or temperature interval to be dispensed/printed, such as below 4° C., may be processed by keeping the temperature of the ink material in the ink material channel 5 stable and accurate before, between and after a dispensing action.

The temperature-regulating system 1, 6, 7, 8 may comprise a heat transfer arrangement 1 arranged to transfer heat to/from the material cartridge 2, the ink material channel 5 and the ink material therein. The heat transfer arrangement 1 may be arranged in direct contact with an outside of the material cartridge 2 or be at a close distance from the material cartridge or in contact with or at a close distance from a material cartridge cooling/heating block surrounding or partly surrounding the material cartridge 2.

The temperature-regulating system may further comprise a heat-pump system 6, 7, either an active system, such as a fan, a liquid cooling system, or a passive system, such as finned heatsinks, or a combination of either, to transfer heat from or to the ambient environment.

The heat transfer arrangement 1, 6, 7, 8 may comprise one or more of a heat exchange 8 device such a heat exchanger, a Peltier element, electrical heater or cooler, radiator, a liquid heat exchanger, a fan, and a liquid cooling unit.

The temperature-regulating system 1, 6, 7, 8 may be arranged to adjust the temperature of the ink material channel 5 and ink material at specific points along the ink material channel 5 or along the whole extension of the ink material channel 5.

The temperature adjustment of the ink material in the ink material channel 5, based on instructions received from the temperature analysing unit 102, may be a continuous feedback loop of measured data and temperature adjustment. The measured temperature data may be incorporated into a control algorithm used by the temperature regulating system for adjusting the temperature of the ink material channel 5 and ink material.

Controlling the temperature of the ink material in the ink material channel 5, the temperature of ink material leaving the ink material channel 5 through the ink material outlet, possible through a tip portion 4 connected to the ink material outlet, may be controlled.

The material cartridge arrangement 100, 101 may further comprise an ink material level measuring device 104 arranged to measure a level of ink material in the ink material channel 5 and sending the measured level of ink material to the temperature analysing unit 102.

In one embodiment, if the ink material pressurising device 3 is a plunger the ink material level measuring device 104 may comprise a plunger stepper motor. A position of the plunger stepper motor gives information about a level of ink material in the ink material channel 5. Additionally, the ink material level measuring device 104 may comprise sensors e.g. magnetic or optical encoders and a feedback loop may be governed by the following equations:

$$Z_{offset} = Z_{max} - (Z_a - Z_b) \quad (1)$$

$$Z_{c,n} = \left(\frac{Z_a - Z_b}{Z_n}\right)c - \left(\frac{Z_a - Z_b}{Z_n}\right)(c-1) \quad (2)$$

$$Z_{3,3} = \left(\frac{Z_a - Z_b}{3}\right)3 - \left(\frac{Z_a - Z_b}{3}\right)2 \quad (3)$$

$$Z_{2,3} = \left(\frac{Z_a - Z_b}{3}\right)2 - \left(\frac{Z_a - Z_b}{3}\right)1 \quad (4)$$

$$Z_{1,3} = \left(\frac{Z_a - Z_b}{3}\right)1 - \left(\frac{Z_a - Z_b}{3}\right)0 \quad (5)$$

Equations 1 and 2 are the most important for determining the plunger position. Equations 3-5 are explicit examples for use in a material cartridge arrangement wherein the ink material channel is divided in a three-zone dispensing unit. The variables to these equations are defined in the following table. All Z terms are measured in stepper motor pulses and will vary based on motor control methods. Z terms are determined experimentally.

| Term | Definition |
| --- | --- |
| $Z_{offset}$ | Offset from $Z_{max}$ to beginning of uppermost zone, defined as most retracted position of plunger when material begins to extrude. |
| $Z_{max}$ | Position of plunger arm at greatest retraction. |
| $Z_a$ | Initial position of plunger when it enters uppermost zone. |
| $Z_b$ | Final position of plunger when it reaches limits of dispensing. |
| c | Zone number. |
| n | Constant that determines how many zones to create. Should be equal to maximum number of zones in an ink material channel. |

Figure 6:
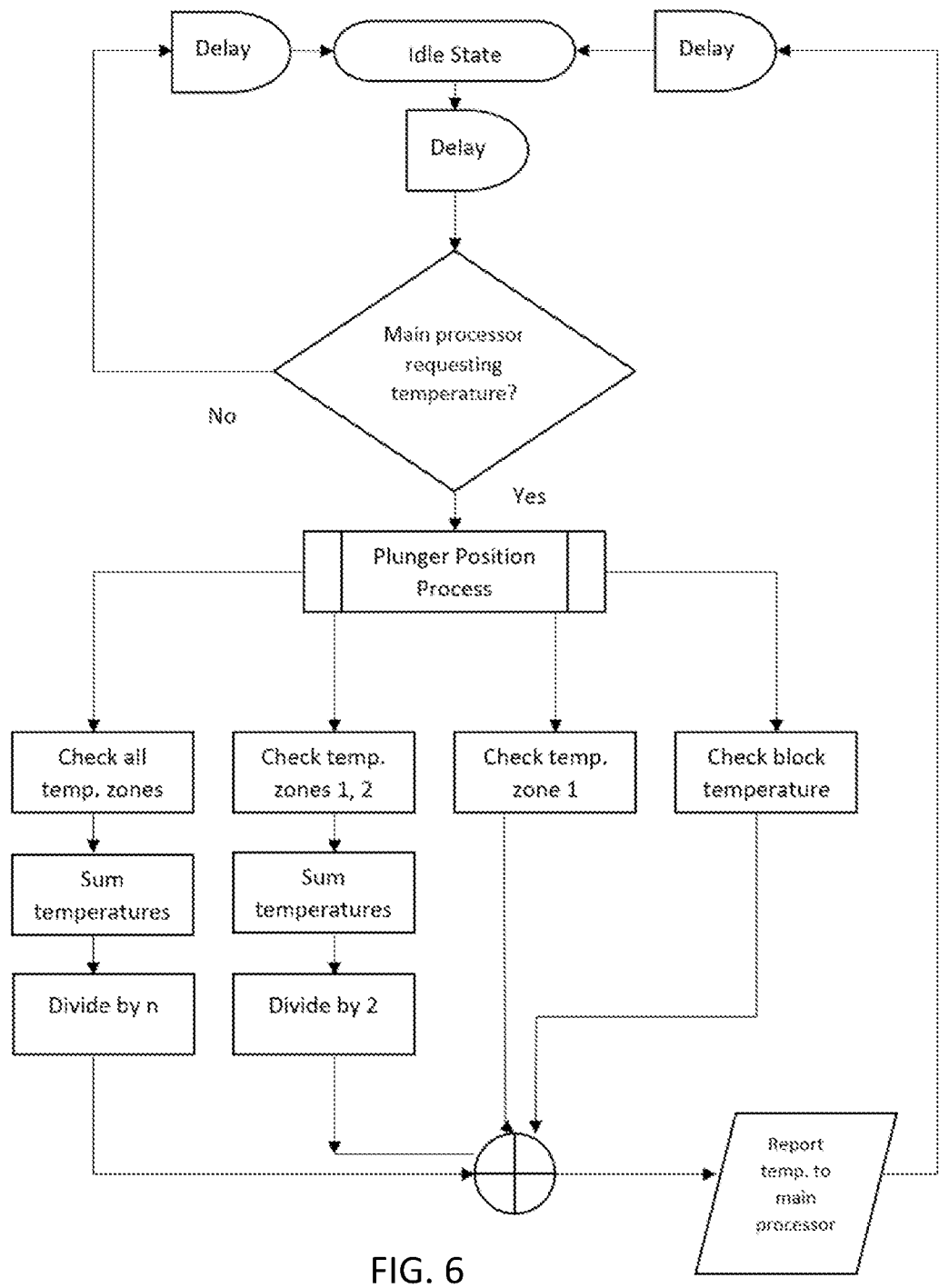
FIG. 6 shows schematically a control algorithm that may be used in the material cartridge arrangement of FIG. 1 or FIG. 3, wherein a level of ink material in the ink material channel is measured and used together with measured temperatures.

In FIG. 6, this is implemented by arranging three temperature sensing elements 16 along the ink material channel 5. The ink material channel 5 being divided in three zones along the extension of the channel 5 with a temperature sensing element 16 in each zone. Zone 3 being a zone starting at the first end 2a of the cartridge and zone 1 being a zone ending at the second end 2b of the cartridge 2. When a lower end of the plunger is in zone 3, temperature measurements from all temperature sensing elements 16 are used by the analysing unit 102. When the plunger end is in zone 2 temperature measurements from temperature sensing elements in zone 1 and 2 are used. When the plunger end is in zone 1 temperature measurements from the temperature sensing element in the first zone is used. A temperature sensor mounted in a cartridge block may be used in all other situations.

Alternatively or additionally, the ink material level measuring device 104 may comprise a pneumatic controlled system.

From the ink level information and information about positions of the temperature sensing elements 16 along the ink material channel 5 the temperature analysing unit 102 can determine which of the temperature sensing elements 16 are measuring temperatures of the ink material and which are measuring at positions where there is no ink material in the ink material channel 5. Only temperature sensing elements measuring at positions where there is ink material in the ink material channel 5 may then be included in the analysis of measured temperatures and in a temperature adjustment based thereon. This is an example of a closed loop system. FIG. 6 shows schematically a control algorithm that may be used in the material cartridge arrangement of FIG. 1 or FIG. 3, wherein a position of ink material in the ink material channel is measured as described above. Temperature sensing elements 16 no longer in the material zone are ignored and only data from temperature sensing elements within the material zone is evaluated.

In an alternative embodiment, an open-loop system, feedback from all temperature sensing elements 16 regardless of level of ink material in the ink material channel 5 are analysed by the analysing unit 102 and used in adjusting the temperature. Thereby including a margin of error in the temperature adjustment.

Figure 7:
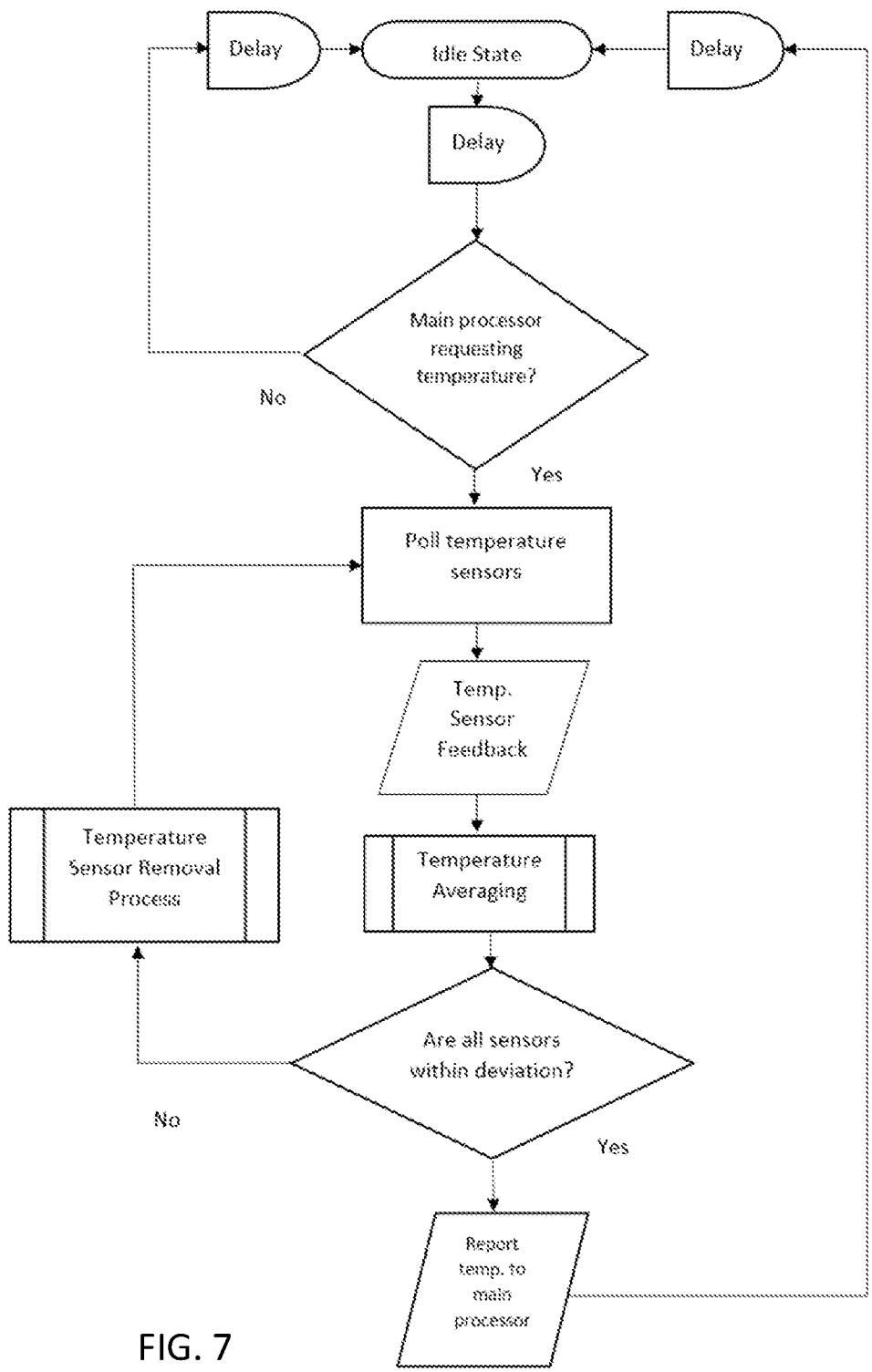
FIG. 7 shows schematically a control algorithm that may be used in the material cartridge arrangement of FIG. 1 or FIG. 3, wherein temperatures from individual temperature sensing elements are polled and summed.

FIG. 7 shows schematically a control algorithm that may be used in the material cartridge arrangement of FIG. 1 or FIG. 3, wherein individual temperature sensing elements are polled and summed. If the measured temperature of one temperature sensing element 16 deviates more than a certain amount from the measured temperature of another sensing element 16 or deviates from a mean value of a series of temperature measurements of that specific sensing element 16 (the mean can be either an arithmetic mean or a weighted average), temperature data from such a sensing element may be excluded from the temperature analysis. The temperature readings from the first poll may be compared to the mean and any sensing element 16 outside a defined tolerance is not polled for the next polling, summing, and averaging of temperatures. In this open loop control scheme the plunger position is no longer used.

Both forms of control may use a combination of logical evaluations and electric feedback to perform their task.

Figure 4:
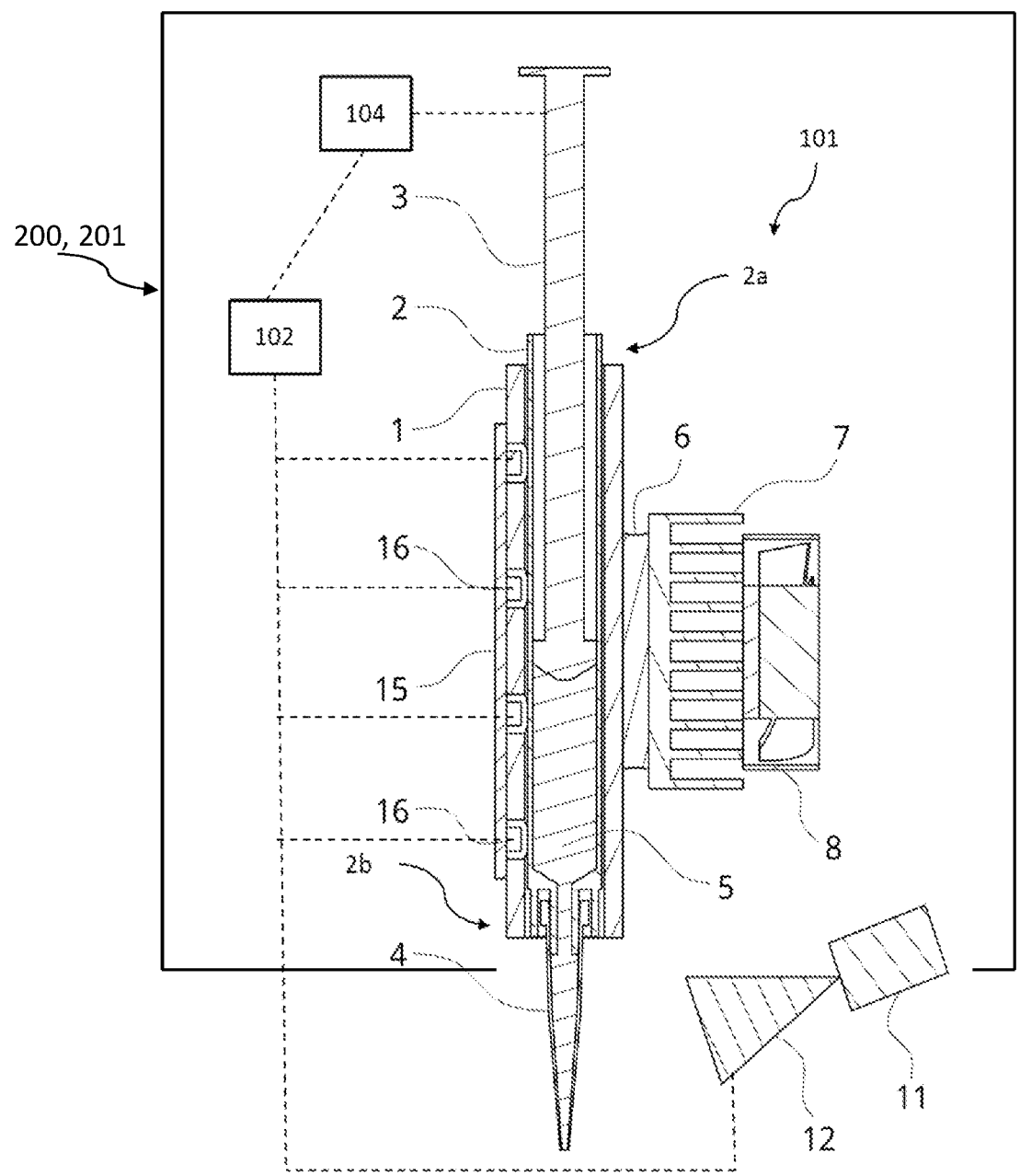
FIG. 4 shows a dispensing system/3D printer comprising the material cartridge arrangement shown in FIG. 3.

On or more of the material cartridge arrangements 100, 101 described above may be used as or in a biodispensing system 200 or in a 3D printer 201, such as a 3D bioprinter, see FIG. 4. Some parts of the material cartridge arrangements 100, 101 may be shared in between at least some of the material cartridge arrangements in the biodispensing system 200/3D bioprinter 201.

A 3D bioprinter utilizes 3D printing and 3D printing-like techniques to combine cells, growth factors, and biomaterials to fabricate tissue-like or tissue analogue structures that imitate natural tissue characteristics. Generally, 3D bioprinting utilizes the layer-by-layer method to deposit/dispense dispensing contents, such as materials known as bioinks or hydrogel to create tissue-like structures that are later used in life science and tissue engineering fields. Bioprinting covers a broad range of biomaterials or bioinks.

The dispensing system may be used as or in a biodispensing system. A biodispensing system is a system that is capable of precisely dispensing material onto a specific point in a controlled way.

Dispensing systems can use either air pressure or positive displacement to dispense fluids in a controlled way. Dispensing systems can be manually or automatically operated. They can be used in small volume and mass production applications and in various applications (e.g., electronics industry, automotive industry, life science industry) that demand accurate, uniform, process-controlled, and high throughput of repeatable depositions.

Dispensing systems may be used in life science applications such as liquid handling/dispensing of low (pL to nL range) and medium (microliter range) volumes of cell culture reagents, compound dosing, combinatorial dispensing, titration, dispensing RNA samples for PCR analysis and in 3D bioprinting.

Figure 5:
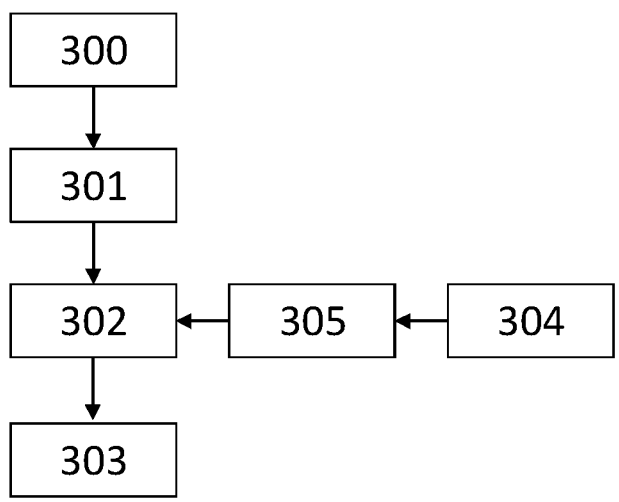
FIG. 5 shows a block diagram of a method of measuring and adjusting a temperature of an ink material contained in an ink material channel of a material cartridge of a dispensing system.

In FIG. 5 is illustrated a method of measuring a temperature of an ink material contained in an ink material channel 5 of a material cartridge 2 of a dispensing system 200, 201. The method comprises: arranging 300 at least one temperature sensing element 16 along a direction of extension of the ink material channel 5 at a wall 9 of the ink material channel 5. By means of the at least one temperature sensing element 16 measuring 301 a temperature at the ink material channel wall 9, and analysing 302 temperature sensor data from the at least one temperature sensing element 16.

The method may further comprise to, based on the analysed temperature sensor data, adjust the temperature 303 of the ink material in the ink material channel 5.

The method may further comprise to determine 304 a level of ink material in the ink material channel 5 and compare 305 the level of ink material to a position of each temperature sensing element 16 along the ink material channel and use this comparison to determine which temperature sensor data to include in the analysis 302.

The invention claimed is:

1. A material cartridge arrangement for a dispensing system, comprising
    a material cartridge having a first end, an opposing second end and an ink material channel extending between the first and second ends in the material cartridge, the ink material channel being bounded by an ink material channel wall/walls extending between the first and second ends, the ink material channel being arranged to hold an ink material, and the second end comprises an ink material outlet,
    an ink material pressurizing device arranged to cause ink material held in the ink material channel to flow in a direction from said first end towards said second end and through the ink material outlet,
    at least two temperature sensing elements arranged at a distance from each other along the direction of extension of the ink material channel, and each arranged to measure a temperature at said ink material channel wall,
    an ink material level measuring device arranged to measure a level of ink material in the ink material channel,
    a temperature analyzing unit arranged to receive: temperature data from the temperature sensing elements; ink material level information from the ink material level measuring device, and information about positions of the temperature sensing elements along the ink material channel, and to determine which of the temperature sensing elements are measuring temperatures of the ink material and which are measuring at positions where there is no ink material in the ink material channel, and to analyze measured temperatures from temperature sensing elements measuring at positions where there is ink material in the ink material channel, and
    a temperature regulating system arranged to, based on instructions received from the temperature analyzing unit, adjust the temperature of the ink material in the ink material channel based on the temperatures measured by the temperature sensing elements measuring at positions where there is ink material in the ink material channel.

2. The material cartridge arrangement of claim 1, comprising at least three, at least four, at least five or at least six temperature sensing elements arranged at a distance from each other along the direction of extension of the ink material channel.

3. The material cartridge arrangement of claim 1, further comprising a tip portion connectable to the ink material outlet of the material cartridge and at least one temperature sensing element arranged to measure a temperature at the tip portion.

4. The material cartridge arrangement of claim 1, wherein the temperature sensing element is selected from a group of thermocouples, thermistors, resistance thermometers, semiconductor sensors, digital temperature sensors, thermopiles, thermal cameras, infrared array sensors, laser based temperature sensors and pyrometers.

5. The material cartridge arrangement of claim 1, wherein the at least one temperature sensing element is arranged in the ink material channel wall.

6. The material cartridge arrangement of claim 5, wherein the at least one temperature sensing element is arranged between an outer sleeve and an inner sleeve of the ink material channel wall.

7. The material cartridge arrangement of claim 1, wherein the at least one temperature sensing element is arranged at an outside of the ink material channel wall, the outside of the wall facing away from material ink hold in the material ink channel.

8. The material cartridge arrangement of claim 1, wherein the at least one temperature sensing element is arranged at an inside of the ink material channel wall, the inside of the wall facing towards the material ink hold in the material ink channel.

9. The material cartridge of claim 1, wherein a material of the ink material channel wall has a thermal conductivity of at least 100 W/mK or above.

10. A 3D printer comprising the material cartridge arrangement of claim 1.

11. A biodispensing system comprising the material cartridge arrangement of claim 1.

12. A method of measuring a temperature of an ink material contained in an ink material channel of a material cartridge of a dispensing system, the method comprising:

arranging at least one temperature sensing element along a direction of extension of said ink material channel at a wall of said ink material channel, by means of the at least one temperature sensing element measure a temperature at said ink material channel wall, analyzing temperature sensor data from the at least one temperature sensing element, and determining a level of ink material in the ink material channel and comparing the level of ink material to a position of each temperature sensing element along the ink material channel and using this comparison to determine which temperature sensor data to include in the analysis.

13. The method of claim 12, further comprising, based on the analyzed temperature sensor data, adjusting the temperature of the ink material in the ink material channel.

* * * * *